Oct. 6, 1925.
H. INGRAM
1,555,849
PRESSURE CONTROL SYSTEM FOR STERILIZING AND PROCESSING APPARATUS
Filed Sept. 18, 1923  3 Sheets-Sheet 2
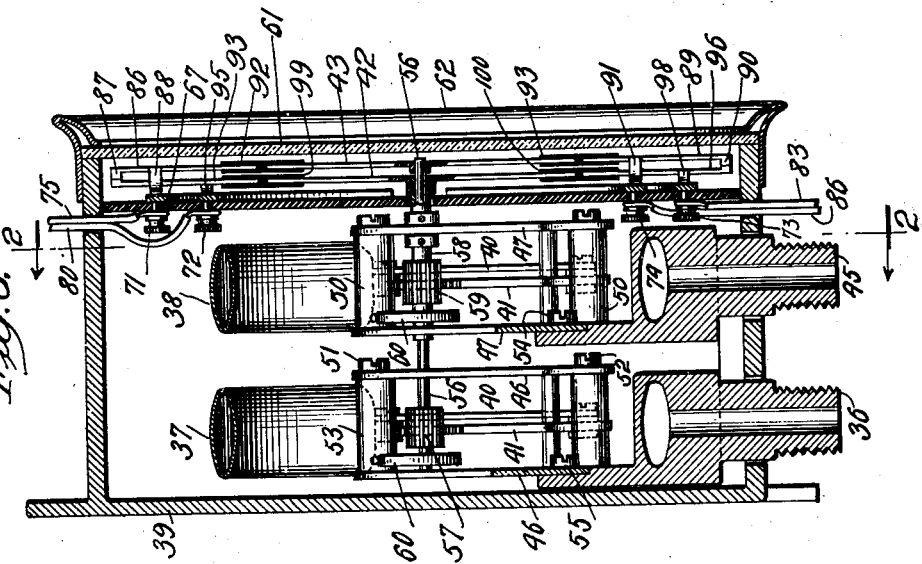
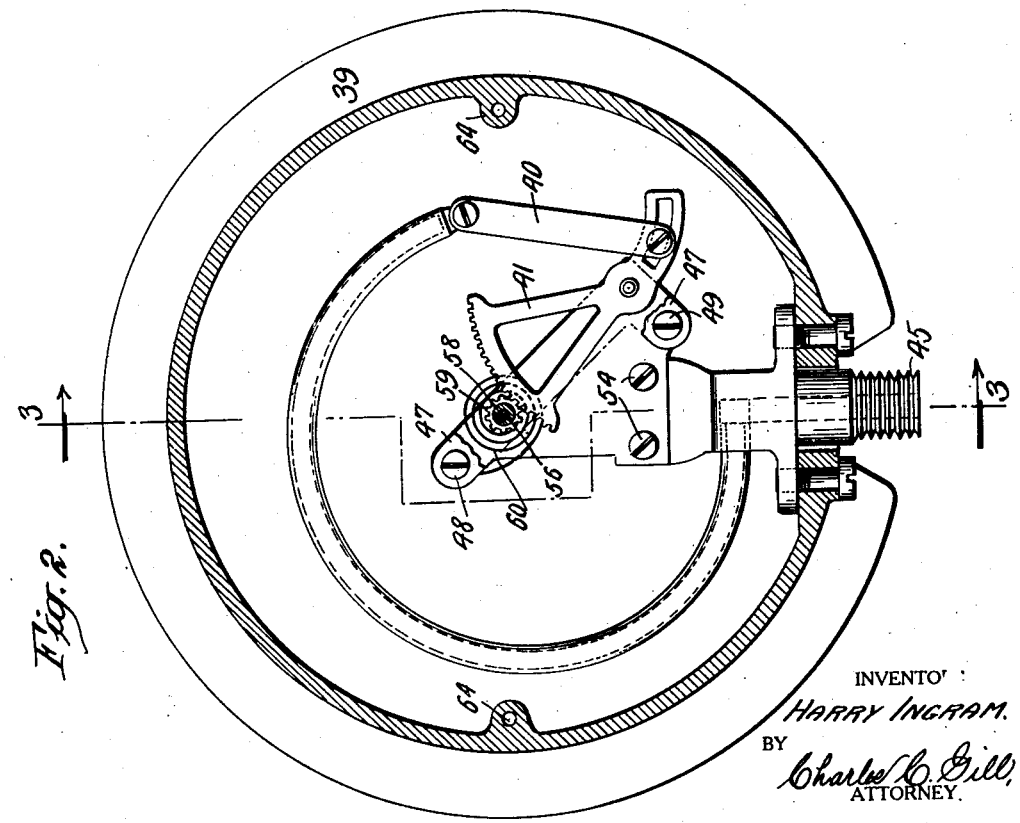
INVENTOR
HARRY INGRAM.
BY Charles C. Gill,
ATTORNEY.

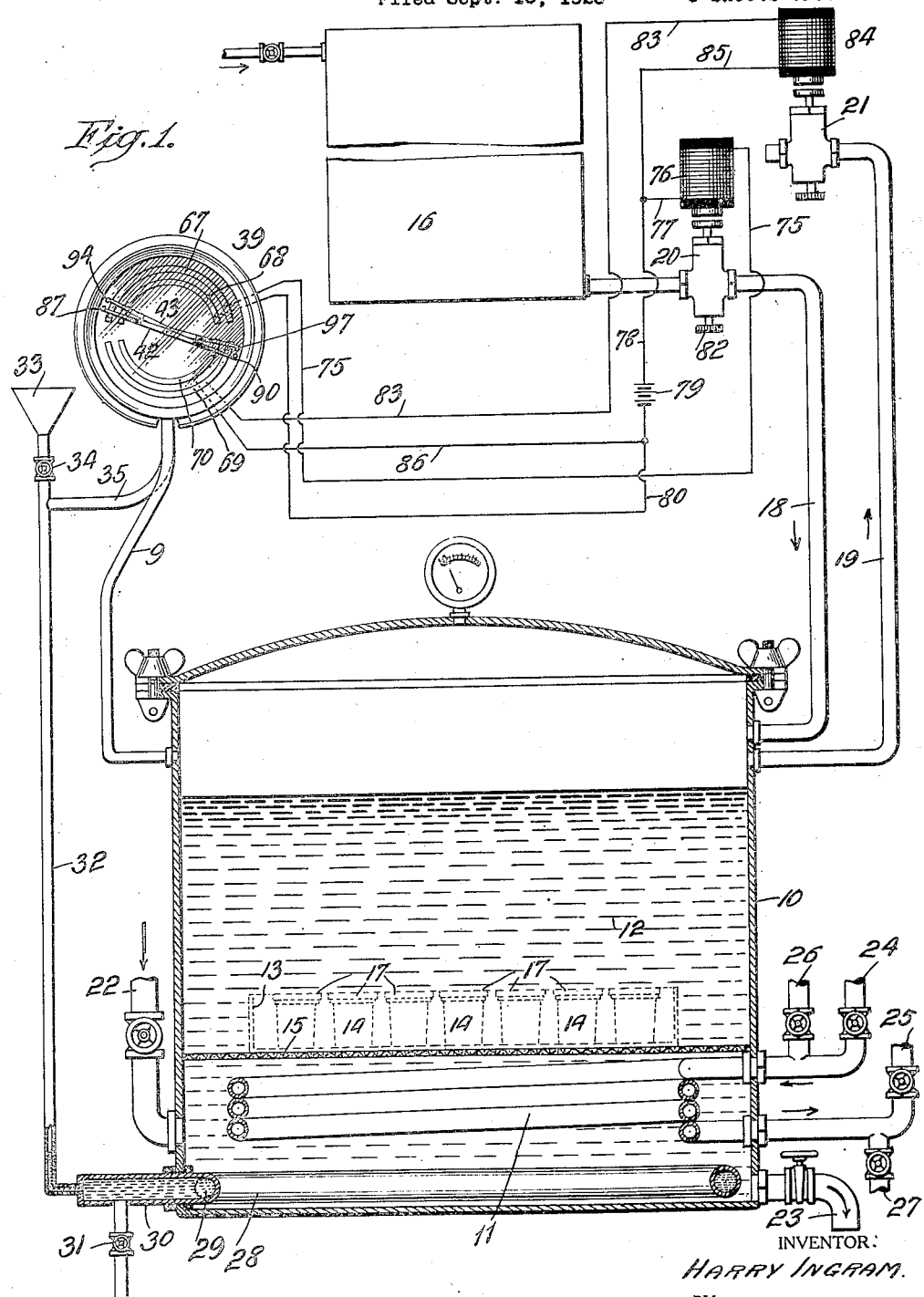

Oct. 6, 1925.
H. INGRAM
1,555,849
PRESSURE CONTROL SYSTEM FOR STERILIZING AND PROCESSING APPARATUS
Filed Sept. 18, 1923   3 Sheets-Sheet 3
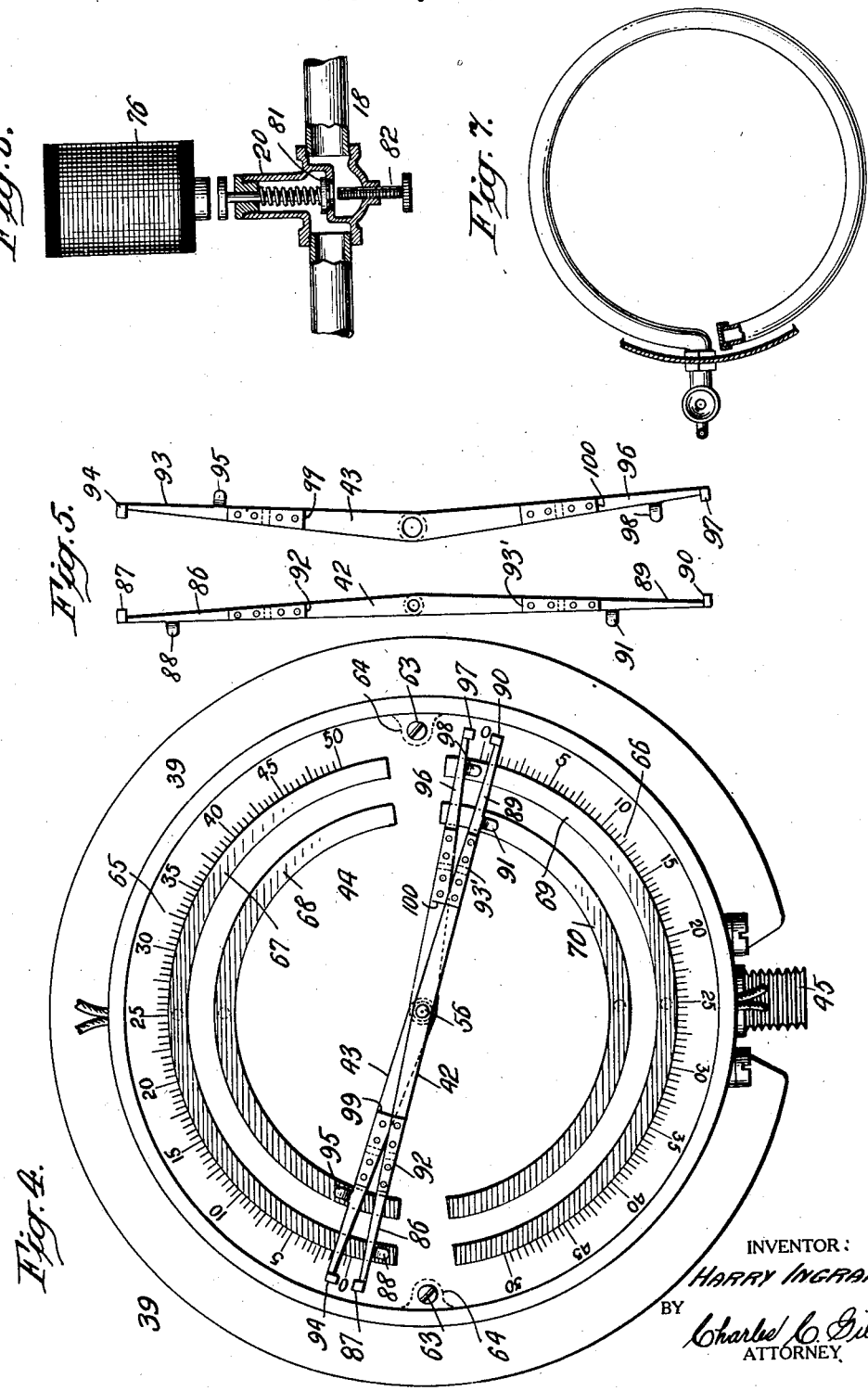
INVENTOR:
HARRY INGRAM.
BY
Charles C. Gill,
ATTORNEY Patented Oct. 6, 1925.

1,555,849

UNITED STATES PATENT OFFICE.

HARRY INGRAM, OF BROOKLYN, NEW YORK.

PRESSURE-CONTROL SYSTEM FOR STERILIZING AND PROCESSING APPARATUS.

Application filed September 18, 1923. Serial No. 663,339.

*To all whom it may concern:*

Be it known that I, HARRY INGRAM, a citizen of the United States, and a resident of Brooklyn, in the county of Kings and State of New York, have invented certain new and useful Improvements in Pressure-Control Systems for Sterilizing and Processing Apparatus, of which the following is a specification.

The invention relates to apparatus for sterilizing or other heat processing food products and the like contained in closed receptacles, for example, tumblers, jars or the like, to which caps have been applied, preferably by vacuum sealing machines. In such processing operation the capped receptacles are submerged in water or other medium contained in a suitable tank or retort and subjected therein to the desired temperature ranging usually from 220 to 250 degrees Fahrenheit, and provision must be made to supply pressure to the processing tank or retort sufficient to overbalance the internal pressure generated within the receptacles, thereby to prevent such internal pressure from blowing off the caps.

My invention consists in combining in an apparatus for the purpose specified, a processing tank or retort and means for maintaining an adjustable pressure in the tank countering the internal pressure developed in the receptacles during the treatment thereof, such pressure in the tank increasing with the increase of temperature in the retort and the consequent increase of internal pressure within the receptacles and decreasing, at the end of the processing operation, with the decrease of temperature in the retort and resultant decrease of internal pressure in said receptacles. My apparatus involves a member responsive to ascending temperature variations in the tank or retort and adapted by its operation to admit from time to time an increase of external pressure into the retort in accordance with the requirements of the receptacles, and also a member which is responsive to the external pressure within the retort and acts to cut off the supply of such pressure when the proper amount thereof has entered the retort. The member which responds to the varying increasing temperatures in the retort also responds to the varying decreasing temperatures in the retort, as when the retort is being cooled, and then actuates mechanism by which on the decrease of such temperatures in the retort the external pressure in the retort is allowed to exhaust, the proportions or periods of said exhaust being regulated by the necessities of the receptacles being cooled and automatically controlled by the aforesaid member which is responsive to the external pressure within the retort.

I preferably make use, in the apparatus of my invention, of two curved Bourdon springs or tubes in one pressure gauge casing having a special dial and two special two-ended make-and-break switch-hands traversing opposite portions of the face of said dial and operable respectively from said springs, and with one of said springs I associate means whereby the spring becomes responsive to variations of temperature in the retort, while with the other of said springs I associate means whereby said spring becomes responsive to external pressure conditions within the retort and acts to cut off the supply of such pressure when the requisite degree of pressure is within the retort and also acts to cut off the exhaust of such pressure from the retort at such stages during the final cooling of the retort, as may be requisite and proportioned to the temperature of the retort and the requirements of the receptacles therein. The spring which is responsive to temperature-changes in the retort acts to admit external pressure to and open the exhaust therefor from the retort and is controlled as to the extent of such admission and exhaust by the spring which responds to the external pressure conditions in the retort. The Bourdon springs cooperate with each other and with the aforesaid hands and dial to make and break electric circuits which include means for admitting external pressure to and cutting the same off from the retort and also means for exhausting pressure from the retort, the entire system operating automatically at proper stages and subject to the requirements of the retort and the receptacles under treatment therein.

The invention will be fully understood from the detailed description hereinafter presented, reference being had to the accompanying drawings, in which:

Fig. 1 is a diagrammatic view, partly in section and partly broken away, of a processing apparatus equipped with pressure control features embodying my invention;

Fig. 2 is a vertical transverse section, on a larger scale, through a gauge and switch mechanism forming a portion of my invention, the section being on the dotted line 2—2 of Fig. 3, this gauge being of duplex character and controlling the operation of certain valves for respectively admitting pressure to the top of the retort in accordance with increasing temperature changes therein and exhausting such pressure from the retort when there is a surplus thereof, as when the contents of the retort are being cooled at the end of the processing operation;

Fig. 3 is a central vertical section through the same taken on the dotted line 3—3 of Fig. 2;

Fig. 4 is a front elevation of the same;

Fig. 5 is a detached face view of the two indicating and switch-hands employed on the dial of the gauge shown in Figs. 2, 3 and 4;

Fig. 6 is a detail view, partly in section, of the valve means for admitting compressed air to the retort in accordance with increasing temperature-changes therein and the varying requirements of the packages under processing treatment, and Fig. 7 is a top plan view, partly in section, of an auxiliary tank I employ in the retort, with the means for charging the same with a liquid, as water or mercury, for illustration, a portion of the shell of the retort being shown in section.

In the drawings, 10 designates a sterilizing or processing tank or retort of ordinary type, 11 a steam coil therein for properly heating the water 12 and 13 a basket of jars or tumblers 14 submerged within the water 12 and resting upon a screen or perforated plate 15, the features thus far identified being of any usual or suitable type.

16 designates a compressed air tank with the use of which suitable pressure is introduced into the upper end of the tank 10 for exerting the proper pressure on the caps 17 of the tumblers or containers 14 for preventing the internal pressure generated within the tumblers or containers during the sterilizing or processing operations, from blowing off the caps 17. I connect the tank 16 with the tank 10 by means of a supply-pipe 18, and from the upper end of the tank 10 I lead a blow-off pipe 19, said pipes being respectively equipped with valves 20, 21 to control the passage through them.

The tank 10 is equipped with a supply pipe 22 for water and with an outlet drain 23. The steam coil 11 is employed for heating the water 12 within the tank 10, and after the processing operation has continued a sufficient length of time said coil 11 is used for circulating cold water therein for cooling the water 12. The coil 11 has valved inlet and outlet connections 24, 25, respectively, for steam and valved inlet and outlet connections 26, 27, respectively, for use when cold water is to be circulated through the coil 11.

Within the tank 10 I arrange a ring-shaped tubular auxiliary pressure tank 28 affording a chamber 29 for liquid and which is sealed at one end, as shown in Fig. 7 and provided with a pipe connection 30 at its other end, said connection 30 being equipped with a drain 31. I recommend the ring-shaped tank 28 as one convenient and desirable means for providing the auxiliary chamber 29, but obviously my invention is not limited to the shape or position of this tank so long as it is subject to the temperature within the retort 10 and may reflect such changes of temperature as may from time to time take place within said retort. The auxiliary tank 28 is employed in connection with other features of the apparatus, as a governor or controller for automatically regulating the pressure within the tank 10 so that at all times said pressure shall preponderate to the extent of two or three pounds, for instance, over the pressure generated by the processing operation within the tumblers 14.

The pipe 30 communicating with the auxiliary pressure-tank 28, of whatever form said tank may take, has connected with it an upwardly extending pipe or tube 32, which, at a suitable elevation, has a filling funnel 33 and a valve 34, said valve to be opened when liquid is supplied to the tank 28 and to as much of the length of the tube 32 as may be desired, and then closed. The tube 32 is connected by a branch pipe 35 with the nozzle 36 supporting and in communication with the coiled Bourdon tube 37, this feature 37 being commonly employed in pressure gauges. In my apparatus I make use of two Bourdon tubes 37, 38 and they are preferably mounted within a single dial-casing 39 and are alike and of the form shown in Fig. 2 and connected at their outer ends by adjustable links 40 with sectors 41, which by means of suitable pinions are caused to rotate shafts on which the hands 42, 43 are respectively mounted, whereby said hands are given their proper movements over the face of a dial 44, said hands and dial being novel, while the Bourdon tubes or springs, links 40 and sectors 41 are in themselves, separately considered, of known commercial type. The bourdon 38 is supported by and in communication with a nozzle 45 which corresponds with the companion nozzle 36 and is in communication through a pipe 9 with the main pressure chamber of the retort 10. The nozzle 36 supports two parallel vertical plates 46, and the nozzle 45 supports two corresponding parallel vertical plates 47, which are connected together at their upper and lower portions by screws 48, 49, spacing bushings 50 being provided on said screws. The plates 46 are similarly connected together by screws 51, 52 on which are spacing bushings 53. The rear plate 47 is secured by screws 54 to a flange of the nozzle 45, and the rear plate 46 is likewise secured by screws to a flange of the nozzle 36. The plates 46, in their upper portions, afford bearings for a rotary shaft 56, on which is secured a pinion 57 meshing with the quadrant 41 of the bourdon 37, and the plates 47, in their upper portions, afford bearings for a tubular rotary shaft 58 on which is secured a pinion 59 meshing with the quadrant 41 of the bourdon 38. The shafts 56, 58 are each equipped with the usual resistance spring 60 common to pressure gauges. The shaft 56 extends freely through the tubular shaft 58 and through the center of the dial 44 and has secured on its outer end the hand and switch 42, and the tubular shaft 58 extends through the dial 44 and has secured on its outer end the hand and switch 43. The dial 44 and hands 42, 43 are protected by a front glass disk 61 held in place by a removable ring-frame 62 of usual character. The dial 44 may be secured within the casing 39 by means of screws 63 which enter lugs 64 formed on the walls of the casing (Figs. 2 and 4).

The dial 44 and hands 42, 43 are of special construction and perform special duties not usual to pressure gauges. The dial 44 is a disk of insulating or non-conducting material and on the upper half of its face bears a scale 65 of pounds pressure ranging, in this instance, from "0" to "50" and reading from left to right, while on the lower half of its face said dial 44 bears a scale 66 of pounds pressure ranging in this instance, from "0" to "50" and reading from right to left. The dial 44 has secured upon the upper half of its face two spaced apart concentric conducting segments 67, 68, respectively, and upon the lower half of its face two spaced apart concentric conducting segments 69, 70, respectively, as shown in Fig. 4. Binding posts 71, 72 carried by the dial 44 electrically engage, respectively, the conducting segments 67, 68, and binding posts 73, 74 carried by the dial electrically engage, respectively, the conducting segments 69, 70. From the binding post 71 extends a conductor 75 (Fig. 1) to the electro-magnet 76, whence there is a circuit-return to the binding post 72 through the conductor 77, conductor 78, battery 79 and conductor 80. When a circuit is completed by electrically connecting the segments 67, 68 the magnet 76 becomes energized and opens the valve 20 (Fig. 6) to permit fluid pressure to pass from the tank 16 through the pipe 18 into the upper part of the retort 10, and when the circuit is broken by disconnection between the segments 67, 68 the magnet becomes deenergized and the disk 81 of valve 20 will close and cut off the passage through the pipe 18. I provide the valve 20 with a manually operative screw 82 which may be used in emergency to move the valve-disk 81 from its seat and hold it in open position.

From the binding post 73 extends a conductor 83 to the electro-magnet 84, whence there is a circuit-return to the binding post 74 through the conductor 85, conductor 78, battery 79 and conductor 86. When a circuit is completed by electrically connecting the segments 69, 70 the magnet 84 becomes energized and opens the valve 21 to permit excess or surplus pressure within the retort 10 to exhaust or blow off through the pipe 19, and when the circuit is broken by disconnection between the segments 69, 70 the magnet 84 becomes deenergized and the valve 21 closes and cuts off the passage through the pipe 19. The valve 21 is of the same construction as the valve 20 (Fig. 6).

The means I provide for completing the circuit through the segments 67, 68 and magnet 76, or through the segments 69, 70 and magnet 84 are the hands 42, 43 respectively, and they make and break the respective circuits while traveling over the dial 44 under the control of the bourdons 37, 38 in accordance with the varying pressure requirements of the retort 10.

The hand 42 has at one end a conducting member 86 having laterally projecting lips 87, 88, the latter of which is always in electrical engagement with the segment 67, and has at its other end a conducting member 89 provided with laterally projecting lips 90, 91, the latter of which is always in electrical engagement with the segment 70. The member 86 of the hand 42 crosses over the segments 67, 68 without engaging the segment 68, and said member 86 is spaced and therefore insulated from the body of the hand 42 but is connected therewith by non-conducting material 92. The member 89 of the hand 42 crosses over the segments 69, 70 without engaging the segment 69, and said member 89 is spaced and therefore insulated from the body of the hand 42 but connected therewith by non-conducting material 93. One longitudinal edge of the hand 42 is straight and the opposite edge of the hand is on diverging lines from the center of the hand to the outer ends thereof.

The hand 43 has at one end a conducting member 93 provided with laterally projecting lips 94, 95, the latter of which is always in electrical engagement with the segment 68, and said hand has at its other end a conducting member 96 formed with laterally projecting lips 97, 98, the latter of which is always in electrical engagement with the segment 69. The member 93 of the hand 42 crosses over the segments 67, 68 without engaging the segment 67, and said member 93 is spaced and therefore insulated from the body of the hand 43, but is connected therewith by non-conducting material 99. The member 96 of the hand 43 crosses over the segments 69, 70 without engaging the segment 70, and said member 96 is spaced and therefore insulated from the body of the hand 43 but is connected therewith by non-conducting material 100. The hand 43 diverges outwardly from its center toward its ends and also from the oppositely diverging edges of the hand 42, and due to this construction the hands 42, 43 at both ends may normally lie spaced apart, as shown in Fig. 4, and also be conveniently operated at their end portions in the manner hereinafter described in connection with a single dial and a single casing 39 enclosing both bourdons 37, 38 and their cooperative mechanisms. The invention is not, however, limited in every instance to the employment of the shape or formation of the switch hands 42, 43, since I am aware that said hands may be variously modified without impairing their capability to perform their functions.

In the employment of the apparatus hereinbefore described, the capped receptacles 14 while submerged in the water in the retort 10 are subjected to the temperature desired for processing their contents, this temperature usually ranging from 220 degrees to 250 degrees F. The pressure generated within the receptacles 14 during the processing operation, necessitates the presence of external pressure within the retort to prevent the blowing off of the caps 17 by the internal pressure, and this external pressure is automatically supplied from the tank 16 in proportion as such pressure is required, it being desirable that the external pressure shall preponderate over the internal pressure of the receptacles but not be such as would tend to drive the caps into the receptacles or do other damage. An increase of temperature in the retort necessitates an increase in external pressure in the retort, and this increase of external pressure is brought about by utilizing the increase of temperature to produce an increase of pressure in the pressure gauge and therefrom to effect the opening of the valve 20 admitting pressure from the tank 16 to the top of the retort. When the pressure in the retort should be lowered the valve 21 is automatically opened to allow the surplus pressure to blow off.

During the processing operation the heat of the water 12 is communicated to the fluid in the auxiliary chamber 29, and the expansion of this fluid in the chamber 29 and up into the tube 32 acts to compress the air in said tube upwardly into the Bourdon spring 37, with the result that as the temperature in the retort increases the air in the tube 32 and bourdon 37 becomes more and more compressed until at the proper period or periods the bourdon 37 will, through its sector 41 and the pinion 57, rotate the shaft 56 to turn the hand 42 forwardly along the scale 65 and segment 67 until the contact lug or lip 87 on said hand engages the contact lug or lip 94 on the adjacent end of the hand 43. This engagement of the contacts 87, 94 completes the circuit from the binding post 71 through the magnet 76 and back to the binding post 72 hereinbefore described, such engagement serving, through the members 86, 93 of said hands, to electrically connect the segments 67, 68 which are in engagement with said binding posts. The circuit is thus completed by the contact 87 moving to the contact 94 with the resultant electrical connection of the segments 67, 68. When the contact 87 moves to the contact 94, the hand 42 carries its contact 90 to a greater distance from the contact 97 of the hand 43. When the circuit is completed through the magnet 76 by the engagement of the contact 87 with the contact 84, said magnet, becoming energized, opens the valve 20 and allows the requisite amount of external pressure to pass through the pipe 18 and into the retort, and when the proper degree of external pressure has entered the retort in accordance with the temperature requirements thereof, such pressure acting through the pipe 9 and against the Bourdon spring 38, causes said bourdon, through its sector 41 to impart rotary movement to the pinion 59, shaft 58 and hand 43, with the result that the hand 43 carries its contact 94 from the contact 87 and breaks the circuit through the magnet 76, which then allows the valve 20 to close the pipe 18 and cut off the flow of pressure to the retort 10. The movement of the hand 43 just described carrying its contact 94 from the contact 87 of the hand 42, also results in the contact 97 being moved toward but not against the contact 90 of the hand 42. The hands 42, 43 are then in about the relation to each other shown in Fig. 4, but the left hand ends of said hands, looking at Fig. 4, will have advanced up the scale 65 and the other ends of said hands will have correspondingly advanced toward the left along the scale 66. Should there then be an increase of temperature in the retort 10 and consequently an increase of pressure in the receptacles 14, this increase of temperature will again act through the pipe or tube 32 and bourdon 37 to effect the opening of the valve 20 so that additional pressure will pass from the tank 16 through the pipe 18 to the retort 10, and on said further increase of temperature in the retort 10 requiring the additional external pressure within said retort, the bourdon 37 acts as it did before to turn the hand 42 to carry the contact 87 against the contact 94, thus completing the circuit through the segments 67, 68 and energizing the magnet 76 for opening the valve 20. When the contact 87 moves to the contact 94 as just stated, the contact 90 moves further away from the contact 97. After the requisite pressure has entered the retort 10, such pressure acting through the bourdon 38 will turn the hand 43 another step along the segments 67, 68 and 69, 70, with the result that the contact 94 is carried from the contact 87 and the circuit through the magnet 76 is broken, whereupon the valve 20 will close and no further pressure from the tank 10 will flow to the retort 10. The movement of the hand 43 under the influence of the bourdon 38 as just mentioned, while carrying the contact 94 in a direction from the contact 87 to break the circuit, carries its contact 97 toward the contact 90 of the hand 42, thus reestablishing the relation of said hands 42, 43 to each other, although said hands had been advanced upwardly toward the right on the segments 67, 68 and downwardly toward the left along the segments 69, 70. The same operation as I have just described will be repeated with every material increase of temperature in the retort 10 requiring additional external pressure to be delivered to said retort for preventing the blowing off of the caps 17. The operation of controlling the external pressure within the retort 10 with relation to the temperature in said retort and in the receptacles 14 is carried on automatically and accurately.

After the processing operation has continued the proper length of time, the temperature in the retort 10 must be gradually reduced, and this reduction may be effected by circulating cold water through the coils 11. As the temperature reduces within the retort 10, the pressure within the receptacles 14 also reduces or becomes less, and consequently the external pressure within the retort acting against the caps 17 should also be reduced, and this graduation in the reduction of the internal pressure of the receptacles 14 and external pressure within the retort 10 is automatically taken care of by the apparatus hereinbefore described. A lessening of the temperature in the retort 10 reduces the pressure in the pipe 32 leading to the bourdon 37 and with each reduction of temperature and of said pressure, the hands 42, 43 act reversely to their operation hereinbefore described and by step by step movements return to their initial position and relation to each other shown in Fig. 4. At this time however the contacts 87, 94 do not come together, and hence do not form any circuit between the segments 67, 68, but the hands 42, 43 at their left hand ends, looking at Fig. 4, make the necessary circuits through the segments 69, 70 to energize the magnet 84 for opening the valve 21, said valve opening to release the external pressure from the retort 10 with each decrease of temperature within said retort. During the cooling of the retort 10, the lessening of the pressure in the pipe 32 due to the reduction of temperature in the retort 10, results in the bourdon 37, while regaining its normal or initial condition, operating through its sector 41 to turn the hand 42 reversely to its former operation, carrying the contact 90 into engagement with the contact 97 and the contact 87 further away from the contact 94. When the contacts 90, 97 are in electrical connection, the circuit is formed through the conducting members 89, 96 of the hands 42, 43 and through the segments 69, 70 to energize the magnet 84. When the external pressure within the retort 10 has been sufficiently exhausted through the pipe 19, the bourdon 38 will, acting through its sector 41 move the hand 43 to carry its contact 97 from the contact 90 of the hand 42, thereby breaking the circuit through the magnet 84 and allowing the valve 21 to close. The movement of the hand 43 to carry the contact 97 away from the contact 90 causes the contact 94 to approach the contact 87, leaving the hands 42, 43 in about the relation to each other in which they are shown in Fig. 4. With each decrease of temperature in the retort 10 and consequent reduction of pressure in the pipe 32, the bourdon 37 acts to move the hand 42 to carry its contact 90 against the contact 97 of the hand 43, thus establishing the circuit through the magnet 84 and opening the valve 21 to permit excess external pressure within the retort 10 to escape, and upon this reduction of external pressure within the retort 10, the bourdon 38, regaining its normal condition, acts to turn the hand 43 so as to carry its contact 97 from the contact 90 of the hand 42, thereby breaking the circuit through the magnet 84 and allowing the valve 21 to close.

It will thus be seen that in the use of my apparatus hereinbefore described, with each increase of temperature within the retort 10 and receptacles 14, external pressure is admitted in the proportion of such increase to the upper portion of the retort 10 for preventing the blowing off of the caps 17, the amount of such external pressure thus introduced into said retort being proportioned to the necessities of the receptacles 14, so that the external pressure on the caps 17 is somewhat greater than the internal pressure within said receptacles against the caps.

During the cooling of the retort and receptacles 14 after the processing operation has been concluded, the external pressure within the retort is automatically exhausted in proportion to the reduction of temperature in said retort and the consequent reduction of pressure within the receptacles 14.

I have described the heating of the water 12 in the retort 10 by means of the coil 11, but the invention is not limited to the use of the coil 11 for heating the water, since it is not unusual to inject steam into the water for heating the same.

The fluid within the auxiliary tank 28 may extend therefrom up into the tube 32 as far as may be deemed desirable. The operation of the bourdon 37 will be rendered quicker the higher the column of water within the tube or pipe 32, since under that condition the air above the water in said pipe becomes more quickly compressed in the bourdon 37.

I have combined the electric switch mechanisms and the pressure controlling mechanisms both for the increasing of external retort pressure and the reduction of such pressure, within the one pressure gauge casing 39, and I regard this construction and arrangement as very desirable on account of its compactness and for other apparent reasons, but I do not wish to limit my invention to the combining of all these features of novelty in one casing 39, since the same final results may be obtained in modified arrangements pertaining to the pressure gauge casing, as, for instance, I might employ two of such casings, one containing the bourdon 37 and the other the bourdon 38.

The use of an auxiliary tank 28 closed against the water 12 in the main retort permits me to have an adjustment of the column of water and column of air within the pipe 32 leading to the Bourdon spring 37, and in that way to vary the timing of the action of said Bourdon spring. The pipe 32 may be equipped with an ordinary glass gauge for disclosing the height of the column of water therein, or, for the same purpose, said pipe may be equipped with ordinary try-cocks.

What I claim as my invention and desire to secure by Letters Patent, is:

1. In apparatus of the character described, pressure gauge mechanism responsive to temperature changes within the retort for admitting fluid pressure to the retort on increases of temperature therein and pressure gauge mechanism responsive to the external pressure within the retort for cutting off the supply of fluid pressure when the requisite amount thereof has entered the retort.

2. In apparatus of the character described, pressure gauge mechanism responsive to reducing temperature changes in the retort for exhausting external pressure therefrom, and pressure gauge mechanism responsive to reductions of pressure in the retort for cutting off said exhaust when the requisite amount of external pressure has escaped.

3. In apparatus of the character described, pressure gauge mechanism responsive to temperature changes within the retort for admitting fluid pressure to the retort on increases of temperature therein and exhausting said pressure from the retort on decreases of temperature therein, and pressure gauge mechanism responsive to the external pressure within the retort and adapted to cut off the supply of such pressure when the requisite amount thereof has entered the retort and, on the decreases of temperature in the retort, cutting off said exhaust when the requisite amount of external pressure has escaped from the retort.

4. In apparatus of the character described comprising a main tank or retort within which products contained in capped tumblers or other receptacles are subjected to high temperatures, a compressed air tank connected by a pipe having a supply-valve with said retort for providing the necessary external pressure against the caps on said receptacles to counter the internal pressure generated within the receptacles, a pressure gauge mechanism responsive to temperature changes in said retort and having its responsive member connected by a pipe containing air with a portion of the retort containing water to expand, under retort-temperature, within the lower portion of said pipe to compress the air therein against said responsive member, said member on its movements being adapted to actuate a switch for opening said supply-valve on an increase of retort temperature, to admit an increase of external pressure to the retort, and a pressure gauge mechanism connected with the retort comprising a member responsive to external pressure within the retort and adapted to operate a switch in accordance therewith for closing said supply-valve when the requisite quantity of external pressure has entered the retort.

5. In apparatus of the character described, means for reducing the external pressure within the retort proportionately to the reduction of temperature therein comprising a blow-off valve connected with the retort, a pressure gauge mechanism responsive to reducing temperature changes in said retort and adapted under said changes to open said blow-off valve for releasing external pressure from the retort, and a pressure gauge mechanism connected with the retort and responsive to reducing external pressure changes therein and adapted to close said valve when the requisite external pressure has escaped.

6. In apparatus of the character described, means for providing the necessary external pressure to act against the caps on the receptacles to counter the internal pressure generated within the receptacles, a pressure gauge mechanism responsive to ascending temperature changes in said retort, and having its responsive member connected by a pipe containing air with a portion of the retort containing fluid to expand, under retort-temperature, within the lower portion of said pipe to compress the air therein against said responsive member, said member on its movements under increasing retort temperatures effecting the admission of increases of external pressure to the retort, and a pressure gauge mechanism connected with the retort comprising a member responsive to external pressure within the retort and adapted to cut off the admission of fluid pressure into the retort when the requisite quantity of such pressure has entered the retort.

7. In apparatus of the character described, means for reducing the external pressure within the retort proportionately to the reduction of temperature therein comprising an exhaust connected with the retort, a pressure gauge mechanism responsive to reducing temperature changes in said retort and having its responsive member connected by a pipe containing air with a portion of the retort containing a body of fluid to recede, under reducing retort temperatures, from the air above it in said pipe and thereby relieve said responsive member, said member on its movements under reducing retort temperatures opening the exhaust for external pressure from the retort, and a pressure gauge mechanism connected with the retort and responsive to reducing external pressure changes therein for closing said exhaust when the requisite external pressure has escaped.

8. In apparatus of the character described within which products contained in capped tumblers or other receptacles are subjected to high temperatures, means for providing the necessary external pressure to act against the caps on said receptacles to counter the internal pressure generated within the receptacles, a pressure gauge mechanism responsive to temperature changes in said retort and having its responsive member connected by a pipe containing air with a portion of the retort containing fluid to expand, under increasing retort-temperatures, within the lower portion of said pipe to compress the air therein and to recede, under reducing retort-temperatures, from said air to relieve said responsive member, said member on its movements under increasing retort temperatures effecting the admission of increases of external pressure into the retort and on its movements under decreasing retort temperatures, effecting the exhaust of external pressure from the retort, and a pressure gauge mechanism connected with the retort and responsive to increasing and decreasing external pressure changes therein and adapted when the requisite external pressure has entered the retort to meet increases of retort temperature, to cut off the admission of such pressure and when under decreasing retort temperatures sufficient external pressure has exhausted to meet such condition, to cut off such exhaust.

9. Apparatus as claimed in claim 4, in which the pressure gauge mechanism responsive to temperature changes comprises a Bourdon spring as its responsive member and a shaft rotatable therefrom and carrying the switch, and in which the pressure gauge mechanism responsive to external pressure within the retort comprises a curved Bourdon spring as its responsive member and a shaft rotatable therefrom and carrying the switch.

10. Apparatus as claimed in claim 6, in which the pressure gauge mechanism responsive to temperature changes comprises a Bourdon spring as its responsive member and a shaft rotatable therefrom for effecting the admission of pressure to the retort, and in which the pressure gauge mechanism responsive to retort-pressure comprises a Bourdon spring as its responsive member and a shaft rotatable therefrom for effecting the cut-off of pressure into the retort.

11. Apparatus as claimed in claim 7, in which the pressure gauge mechanism responsive to reducing temperature changes comprises a Bourdon spring as its responsive member and a shaft rotatable therefrom for opening said exhaust, and in which said pressure gauge mechanism responsive to retort-pressure comprises a Bourdon spring as its responsive member and a shaft rotatable therefrom for effecting the closing of said exhaust.

12. Apparatus as claimed in claim 8, in which the pressure gauge mechanism responsive to temperature changes comprises a Bourdon spring as its responsive member and a shaft rotatable therefrom in one direction to admit pressure to the retort and in a reverse direction to effect the exhaust of said pressure, and in which said pressure gauge mechanism responsive to retort-pressure comprises a Bourdon spring as its responsive member and a shaft rotatable therefrom to cut off the admission of pressure into the retort and also cut off the exhaust from the retort under the decreasing retort temperatures.

13. In apparatus of the character described, means for supplying pressure to the retort and controlled by a valve, means for cutting off the supply of such pressure to the retort and cooperative means governing such supply and cut off comprising a pressure gauge apparatus responsive to temperature changes in the retort and having a shaft rotatable therefrom and carrying a conducting temperature switch-hand, a pressure gauge apparatus responsive to pressure within the retort and having a shaft rotatable therefrom and carrying a conducting pressure switch-hand, two main conductors over which said hands travel, circuit conductors including means for opening said supply valve to admit pressure to the retort and respectively electrically connected with said main conductors, said temperature-hand electrically engaging one of said main conductors and said pressure-hand electrically engaging the other of said conductors and said hands normally being separated from each other at their outer conducting portions, said temperature-hand being operable by an increase of retort temperature to move against said pressure-hand and thereby complete the circuit across said main conductors to open said supply valve, and said pressure-hand being operable under retort pressure to leave said temperature-hand and thereby break the circuit and allow said valve to close.

14. Apparatus as claimed in claim 13, in which said hands are divergent to normally space their end portions apart and have contacts on their ends to engage each other for completing the circuit and respectively have contacts riding on said main conductors.

15. In apparatus of the character described, means for reducing the pressure in the retort proportionately to the reduction of temperature therein, comprising a blow-off valve connected with the retort, and cooperative means governing said valve comprising a pressure gauge apparatus responsive to reducing temperature changes in said retort and having a shaft rotatable therefrom and carrying a conducting temperature switch-hand, a pressure gauge apparatus responsive to pressure within the retort and having a shaft rotatable therefrom and carrying a conducting pressure switch-hand, two main conductors over which said hands travel, circuit conductors including means for opening said valve to exhaust pressure from the retort and respectively electrically connected with said main conductors, said temperature-hand electrically engaging one of said main conductors and said pressure-hand electrically engaging the other of said conductors and said hands normally being separated from each other at their outer conducting portions, said temperature-hand being operable by a decrease of retort temperature to move against said pressure-hand and thereby complete the circuit across said main conductors to open said valve, and said pressure-hand being operable under reducing retort pressure to leave said temperature hand and thereby break the circuit and allow said valve to close.

16. Apparatus as claimed in claim 15, in which said hands are divergent to normally space their end portions apart and have contacts on their ends to engage each other for completing the circuit and respectively have contacts riding on said main conductors.

17. In apparatus of the character described, means for supplying pressure to the retort on increasing changes of temperature therein and controlled by a supply valve, means for cutting off the supply of such pressure, means for exhausting the pressure from the retort on decreasing temperature changes therein and embodying a blow-off valve, and means for cutting off said exhaust, said several means comprising two coacting pressure gauge apparatuses, one subject to temperature changes in the retort and the other responsive to retort pressure and each having and being adapted to operate a rotary shaft, a temperature-hand on one of said shafts, a pressure-hand on the other shaft, said hands having oppositely extending members and being conductive in their outer end portions, said hands diverging from each other at their outer end portions, two main conductors over which adjacent end portions of said hands travel and with which they are respectively in electrical engagement, two main conductors over which the other adjacent end portions of said hands travel and with which they are respectively in electrical engagement, circuit conductors extending from said first two main conductors and including means for opening said supply valve and the circuit across said main conductors being closed when said temperature-hand thereat engages the pressure-hand thereat under increasing retort-temperature to open said supply valve and broken when the pressure-hand thereat leaves said temperature-hand thereat under retort pressure to allow said valve to close, and circuit conductors extending from said second two main conductors and including means for opening said blow-off valve and the circuit across said main conductors being closed when the temperature-hand thereat engages the pressure hand thereat under decreasing retort temperature to open said blow-off valve and broken when the pressure-hand thereat leaves said temperature hand thereat under decreasing retort pressure to allow said valve to close.

18. Apparatus as claimed in claim 17, in which said pressure gauge apparatuses are enclosed in a casing having a dial of non-conductive material and on opposite portions of which said two pairs of main conductors are in arcuate form secured, and in which the shaft of the temperature gauge member extends freely through the shaft of the pressure gauge member, both shafts extending through said dial and carrying their respective hands at the face thereof.

19. Apparatus as claimed in claim 17, in which the responsive members of said pressure gauge apparatuses are Bourdon springs and in which the shaft of one extends through the shaft of the other, and in which said hands are at their central portions secured on their respective shafts and insulated from their outer end conductive portions.

Signed at New York city, in the county of New York and State of New York, this 17th day of September A. D. 1923.

HARRY INGRAM.